Jan. 16, 1951　　　F. A. MONTGOMERY　　　2,538,375
HYDRAULIC SHOCK ABSORBER

Filed Dec. 28, 1945　　　　　　　　2 Sheets—Sheet 1

INVENTOR.
FRED A MONTGOMERY
BY
*Milburn & Milburn*
Attorneys.

Jan. 16, 1951  F. A. MONTGOMERY  2,538,375
HYDRAULIC SHOCK ABSORBER
Filed Dec. 28, 1945  2 Sheets-Sheet 2

INVENTOR.
FRED A MONTGOMERY
BY
Milburn & Milburn
Attorneys.

Patented Jan. 16, 1951

2,538,375

UNITED STATES PATENT OFFICE 2,538,375

HYDRAULIC SHOCK ABSORBER

Fred A. Montgomery, Cleveland, Ohio

Application December 28, 1945, Serial No. 637,719

10 Claims. (Cl. 188—88)

This invention relates to the art of hydraulic shock absorbers.

One object of my present invention is to devise a hydraulic shock absorber which is entirely filled with liquid and in which there is no free air.

Another object is to devise such a shock absorber that will absorb the energy of either impact or recoil or both.

Another object is to provide such a shock absorber with readily accessible means, located externally, for adjusting the same.

Another object is to devise such a shock absorber that will operate successfully in any position.

Another object is to provide such a shock absorber with separate means for taking care of the liquid displacement by the piston rod and the liquid displacement by the piston upon the impact stroke.

A more specific object is to provide such a shock absorber with an automatically adjustable chamber for receiving the liquid that is displaced by the piston rod upon the impact stroke.

Another purpose of my device is to compensate automatically for variations in the volume of liquid due to changes in temperature.

Another object is to devise such a shock absorber which is air-cooled in an improved manner.

Another object is to devise an invention which may be embodied in a shock absorber in which the by-pass means for the liquid is provided in the piston or in which other provision is made for the by-pass means.

Another object is to devise such an improved shock absorber that is of the directly-acting type.

Another object is to devise such an improved shock absorber that is of comparatively simple and compact form and inexpensive to manufacture.

Another object is to provide such a shock absorber with means for relieving the danger of liquid leaking out past the sealing gasket means and, at the same time, preventing ingress of outside air to the interior of the shock absorber.

Other objects will appear from the following description and claims when considered together with the accompanying drawing.

Figures 1, 2:
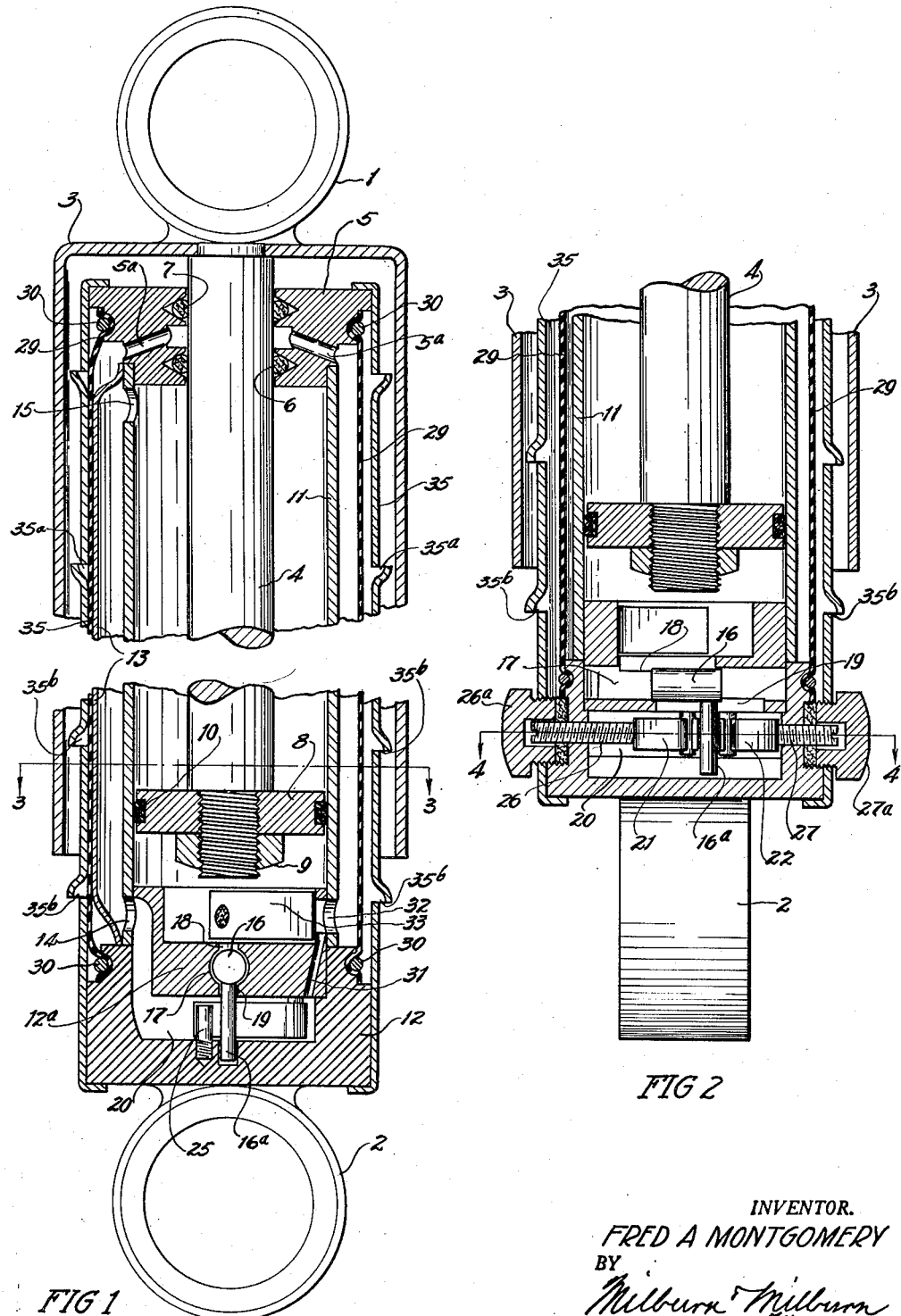
Fig. 1 is a broken longitudinal sectional view of one form of my invention.
Fig. 2 is a partial longitudinal sectional view taken at ninety degrees to Fig. 1 and corresponding to line 2—2 of Fig. 4.
Figure 5:
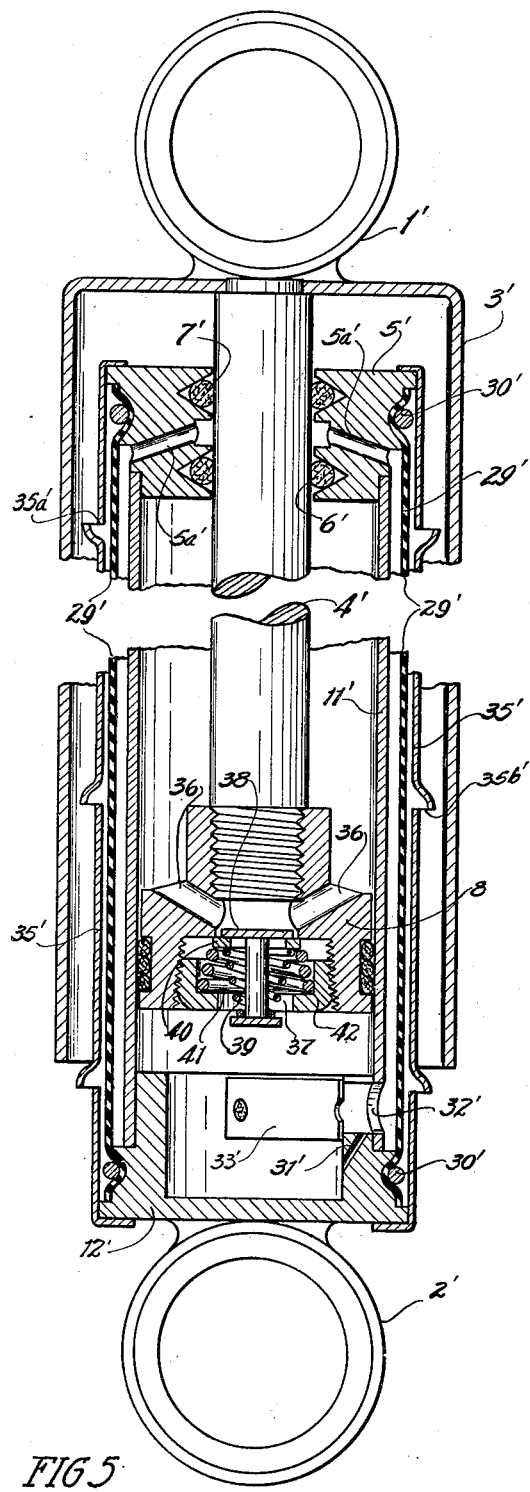
Figure 3:
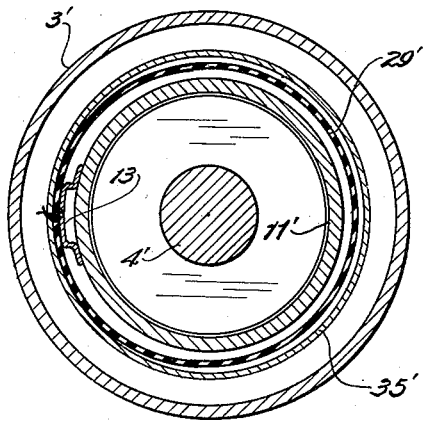
Figure 4:
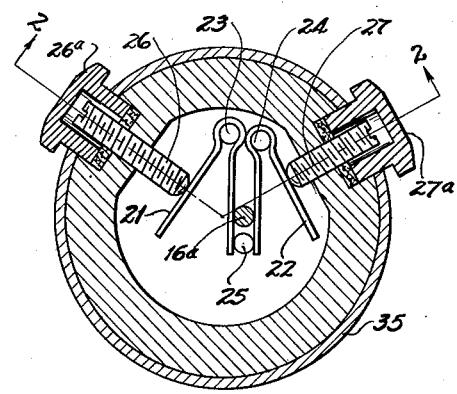

Figs. 3 and 4 are taken on lines 3—3 and 4—4, respectively, of Fig. 1 and Fig. 2; and Fig. 5 is a broken longitudinal sectional view of another form of my invention.

It is to be understood that the present form of disclosure is merely for the purpose of illustration and that there might be devised various modifications thereof without departing from the spirit of my invention as herein set forth and claimed.

By means of the eye rings 1 and 2 at the two ends of my present device, it may be attached to the frame and axle of an automobile, for instance, as a directly-acting shock absorber. The dust shield 3 is attached to the eye ring 1 and to the piston rod 4 and moves therewith. The piston rod 4 extends through the cylinder head 5 and is provided with double packing rings at 6 and 7, respectively, which may be of any desirable cross section.

Upon the inner end of the piston rod 4 there is mounted the piston 8 which is screw-threaded thereupon, with the lock nut 9, or which may be fastened thereto in some other suitable manner. The piston 8 has suitable packing 10 and is adapted for reciprocatory movement within the inner cylinder 11 which has the end heads 5 and 12, respectively.

Extending along the outside of the inner cylinder wall 11 I have provided the rigid by-pass tube 13 which is attached thereto and which has communication at its two ends with the cylinder spaces upon the forward and rearward sides of the piston 8 through the ports 14 and 15 in the inner cylinder wall 11, this by-pass tube 13 being otherwise closed.

The auxiliary cylinder head 12a, which fits in the head 12 and the end of the inner cylinder 11, is provided with suitable passages for the liquid from the forward side of the piston to the rearward side thereof.

The plunger valve 16 is adapted for transverse reciprocatory movement within the bore 17 which has communication through the passage 18 with the space 20 at the end and side of the auxiliary head 12a. The passages 18 and 19 and the valve 16 are so constructed and arranged that the forward stroke of the piston 8 will cause the force of the liquid to be exerted through the passage 18 and upon the one end of the valve 16, the left end as viewed in Fig. 2 of the present drawing, so as to move the valve 16 towards the right; whereupon the liquid is forced through the passage 19, into the space 20 and thence through the port 14 and the by-pass tube 13 to the rearward side of the piston 8. Immediately upon initiation of the rearward stroke of the piston 8, the pressure upon the left end of the valve 16, as viewed in Fig. 2, is released and this valve is then free to be moved in the opposite direction, that is towards the left. The rearward movement of the piston 8 will force the liquid from the rear side thereof through the by-pass tube 13, through space 20 and passage 19 so as to force the valve 16 towards the left, as viewed in Fig. 2, thence past the bore 17 and the passage 18 and into the space upon the forward side of the piston 8.

The valve 16 is mounted upon a pin 16a which extends through the passage 19 and is engaged between the adjacent arms of companion springs 21 and 22 which are mounted upon the pins 23 and 24, respectively, in the auxiliary cylinder head 12a. The adjacent arms of these companion springs have bearing engagement against opposite sides of the fixed stop pin 25 in the head 12. The other arms of the springs 21 and 22 are engaged by the inner ends of the adjustable screws 26 and 27, respectively, which extend through the wall of the cylinder head 12, with suitable packing, and are protected by the removable screw plugs 26a and 27a, respectively. The screws 26 and 27 engage the arms of the springs 21 and 22 in directions substantially normal thereto and, by adjusting these screws, the springs 21 and 22 may be placed under greater or less tension so as to increase or decrease the resistance of the valve 16 to movement in one direction or the other. That is, the force of impact will cause the valve 16 to move towards the right, as viewed in Fig. 2 of the present drawing; and, by adjusting the screw 27 inwardly, the tension of the spring 22 will be increased and thereby there will be correspondingly increased resistance to such movement of the valve 16. In this way, there is effected greater intensity for the impact stroke. By adjusting the screw 27 outwardly, the intensity for the impact stroke may be lessened. In the same manner, the intensity for the recoil may be varied by adjustment of the screw 27 in relation to the spring 22. Thus it will be seen that the valve 16 is virtually floating between the two oppositely exerted forces of the springs 21 and 22; and that, immediately upon release of the liquid pressure upon either end of the valve 16, due to movement of the piston 8 in one direction or the other, the valve 16 will be released to the effect of the increased tension of the spring against which it was moved. The movement of the valve 16 will cause its pin 16a to compress its spring 21 or 22 against the adjustable screw 26 or 27, and the pin 25 serves as a stop for the inner arms of both of the springs 21 and 22.

From the space between the packings 6 and 7 in the head 5 there are the ports 5a through which liquid, which escapes from the inner cylinder 11 past the packing 6, will flow to the expansible chamber within the cylinder 29. The pressure of the liquid upon the gasket 7 will be so slight that there will be no danger of liquid leaking outwardly past the same; but this reduced pressure at this point will be sufficient to prevent entrance of outside air past the packing to the interior of the device.

An automatically expansible cylinder 29 of rubber or other suitable material surrounds the inner cylinder 11 and the by-pass 13 and is mounted at its two ends about the cylinder heads 5 and 12 by means of wires 30 or in any other suitable manner. The purpose of this expansible cylinder is to receive the displaced liquid that corresponds to the area occupied by the piston rod 4; and this expansible cylinder has means of communication with the inner cylinder space upon the forward side of the piston 8 through ports provided in the auxiliary head 12a. The angularly disposed port 31 is intended as a means of communication from the space 20 to the chamber provided by the expansible chamber 29 so as to permit passage thereinto of a quantity of liquid corresponding to that displaced by the piston rod 4. The rest of the liquid, displaced by the movement of the piston 8, will be forced through the by-pass tube 13 to the rear side of the piston 8. Accordingly, the relative capacities of the ports 14 and 31 will be in accordance with the relative diameters of the piston and piston rod. The quantity of liquid that is displaced by the piston rod being a variable, due to the different lengths of its strokes, my expansible cylinder will automatically respond to and accommodate such variable amount of liquid, with the result that the space within the shock absorber may be completely full of the liquid, without the presence of any free air. That is, it is not necessary to allow any free air space to accommodate the varying quantity of liquid that is displaced by the piston rod.

After the piston 8 has been moved forward, thereby exerting pressure of liquid within the expansible cylinder, and then immediately upon the initiation of the rearward movement of the piston 8 and the consequent release of such pressure, the resiliency of the cylinder wall 29 will exert itself upon the liquid contained therewithin and will cause it to return to the space at the forward end of the piston cylinder, the one-way port 32 through the cylinder wall 11 and the auxiliary head 12a being intended for this purpose. The port 32 has a leaf spring 33 which is mounted upon the wall of a cut-out portion of the auxiliary head 12a and which is adapted to be normally held against the inner side of the port 32 so as to close the same. The valve 33 is so arranged that it will be held in closed position by the pressure of the liquid thereagainst as the piston 8 is moved forwardly. However, upon initiation of the recoil, the force of the resilient wall of the expansible cylinder 29 will be sufficient to cause the valve 33 to open and to permit passage of the liquid therethrough. This action may possibly be aided by the suction due to the movement of the piston rearwardly. It will be observed that the port 32 is decidedly larger than the port 31; and the liquid from the expansible cylinder 29 will for the most part, if not entirely, pass through the port 32 upon the recoil. At the same time, the liquid which was caused by the impact to pass through the by-pass 13 to the rear side of the piston 8, will now be forced back through the by-pass 13 to the space at the forward side of the piston 8.

For the purpose of cooling, I have provided the louvres 35a and 35b in the outer cylinder wall 35 which is located in spaced relation between the dust shield 3 and the expansible cylinder 29 and which has its ends connected to the end heads 5 and 12. The louvres 35a in the rear part of the device open towards the rear end thereof while the louvres 35b in the forward part of the device open forwardly, as indicated in the present drawing; so that as the dust shield 3 is moved forwardly upon the impact, outside air will be forced through the rearward louvres 35a into the space surrounding the expansible cylinder 29; and the air, absorbing the heat within the device, will be withdrawn therefrom through the forward louvres 35b as the forward movement of the dust shield continues. These louvres may be made of any desired circumferential extent.

In a modified form of device, I omit the by-pass tube 13 and provide other by-pass means for transmission of the liquid that corresponds to the displacement of the piston. However, this modified form includes an expansible cylinder for the liquid that corresponds to the displacement of the piston rod; and thus the two forms of device have this novel and essential feature in common, as well as the port means for transmission of the liquid to and from the expansible cylinder. Corresponding parts in these two forms of device are indicated by corresponding reference numerals, as for instance the dust shields 3 and 3', the expansible cylinders 29 and 29', etc.

In the modified form of device, I have provided the by-pass ports 36 in the piston 8', these ports being adapted for communication with the central opening 37 in the piston, which is controlled by a double spring valve. The valve 38 is normally forced by its spring 39 to close the opening through the valve ring 40 which is normally forced by its spring 41 to close the central opening through the piston. The spring 41 seats upon the ring 42 which is screw-threaded into the piston; and the valve 38 has a stem with a disk at the end thereof to afford suitable bearing for the spring 39.

Upon the impact stroke, the valve 38 will be forced rearwardly so as to permit passage of the piston-displaced liquid through the opening 37 and the by-pass ports 36 to the cylinder space to the rear of the piston. At the same time, liquid will be forced also through the restricted port 31' and into the expansible cylinder, this liquid corresponding to that displaced by the piston rod. Upon recoil, the valve 38 and the annular ring 40 will be forced forwardly so as to provide full opening through the piston and thereby permit flow of the liquid therethrough to the space upon the forward side of the piston. Also, upon recoil, the one-way spring valve 33' will be forced open to permit passage of liquid from the expansible chamber to the space upon the forward side of the piston.

In this modified form of device, as in the other form herein described, the relative capacities of the ports 36 and 31' will be according to the relative diameters of the piston and piston rod, as above explained.

In the modified form of device, herein disclosed, it may be given a permanent set adjustment or there may be embodied the same means of adjustment as is herein described in connection with the first form of device.

As has been demonstrated by actual test, my present invention is capable of accomplishing all of the objects which are mentioned above and it possesses also other practical advantages. For instance, this device can be manufactured at comparatively low cost.

Notably among the several improved features of my present shock absorber is that of having an expansible chamber for the liquid that is displaced by the piston rod upon the impact stroke. As above stated, this feature precludes the necessity of free air within the shock absorber and thereby avoids certain pronounced disadvantages that are incident to the presence of free air within such a device. For instance, there is avoided the compression of such free air and the heat incident thereto, as well as the expansion of such free air from the heat of the device during use. Likewise, with my present device, the danger of leakage from blown gaskets is greatly reduced and I avoid the danger of air pockets.

With the expansible chamber, my device is automatically compensating for variations in the volume of the liquid due to changes in temperature.

With my present device, there is sufficient internal pressure to prevent ingress of air from the outside but without danger of the liquid being forced out past the packing. Thus my device is always filled entirely with liquid and is devoid of free air.

My present invention makes it possible also to use the same shock absorber for both impact and recoil; and there is a convenient means for adjusting the intensity of the same.

This shock absorber operates in a direct manner and can be used successfully when occupying any position.

In my present disclosure, I have shown two forms of by-pass for the liquid that is transmitted between the two sides of the piston and that corresponds to the displacement by the piston; the purpose being to emphasize the fact that the essential features of my present invention, as above noted, may be employed with either form of by-pass means.

Other advantages of this invention will suggest themselves to those who are familiar with the art to which this invention relates.

What I claim is:

1. A shock absorber comprising a cylinder, a piston within said cylinder, a piston rod connected to said piston and extending out through one end of said cylinder, the space within said cylinder being adapted to be filled entirely with liquid, communicating means between the forward and rear sides of said piston for the liquid that is displaced by said piston, a single reciprocatable valve for controlling the flow of liquid in both directions through said communicating means for taking up impact and recoil, and means readily accessible from the exterior of the shock absorber for adjusting the movement of said valve, a chamber that is separate from said cylinder and that is adapted to receive the liquid that is displaced by said piston rod, and communicating means for the liquid between the forward end of the cylinder and said separate chamber.

2. A shock absorber comprising a cylinder, a piston within said cylinder, a piston rod connected to said piston and extending out through one end of said cylinder, the space within said cylinder being adapted to be filled entirely with liquid, communicating means between the forward and rear sides of said piston for the liquid that is displaced by said piston, a single reciprocatable valve for controlling the flow of liquid in both directions through said communicating means for taking up impact and recoil, and means readily accessible from the exterior of the shock absorber for adjusting the movement of said valve in either direction, a chamber that is separate from said cylinder and that is adapted to receive the liquid that is displaced by said piston rod, and communicating means for the liquid between the forward end of the cylinder and said separate chamber.

3. A shock absorber comprising a cylinder, a piston within said cylinder, a piston rod connected to said piston and extending out through one end of said cylinder, the space within said cylinder being adapted to be filled entirely with liquid, communicating means between the forward and rear sides of said piston for the liquid that is displaced by said piston, a single reciprocatable spring-resistant valve for controlling the flow of liquid in both directions through said communicating means for taking up impact and recoil, and means readily accessible from the exterior of the shock absorber for adjusting the spring resistance of said valve in either direction, a chamber that is separate from said cylinder and that is adapted to receive the liquid that is displaced by said piston rod, and communicating means for the liquid between the forward end of the cylinder and said separate chamber.

4. A shock absorber comprising a cylinder, a piston within said cylinder, a piston rod connected to said piston and extending out through one end of said cylinder, the space within said cylinder being adapted to be filled entirely with liquid, communicating means between the forward and rear sides of said piston for the liquid that is displaced by said piston, a chamber that is separate from said cylinder and that is adapted to receive the liquid that is displaced by said piston rod, said chamber having an automatically pressure-responsive radially expansible wall, and communicating means for the liquid between the forward end of the cylinder and said separate chamber.

5. A shock absorber comprising a cylinder, a piston within said cylinder, a piston rod connected to said piston and extending out through one end of said cylinder, the space within said cylinder being adapted to be filled entirely with liquid, communicating means between the forward and rear sides of said piston for the liquid that is displaced by said piston, a chamber that surrounds said cylinder but is separate from the same and that is adapted to receive the liquid that is displaced by said piston rod, said chamber having an automatically pressure-responsive radially expansible wall, and communicating means for the liquid between the forward end of said cylinder and said separate chamber.

6. A shock absorber comprising a cylinder, a piston within said cylinder, a piston rod connected to said piston and extending out through one end of said cylinder, the space within said cylinder being adapted to be filled entirely with liquid, a chamber surrounding said cylinder and being separate therefrom, to receive the liquid that is displaced by said piston rod, said chamber having an automatically pressure-responsive radially expansible wall so as to be of automatically variable capacity, a by-pass extending through said chamber and adapted to afford means of communication for the liquid between the forward and rear sides of said piston, and communicating means for the liquid between the forward end of said cylinder and said variable chamber.

7. A shock absorber comprising a cylinder, a piston within said cylinder, a piston rod connected to said piston and extending out through one end of said cylinder, the space within said cylinder being adapted to be filled entirely with liquid, a chamber that is of automatically variable capacity surrounding said cylinder and being separate therefrom, to receive the liquid that is displaced by said piston rod, a by-pass extending through said chamber and adapted to afford means of communication for the liquid between the forward and rear sides of said piston, and communicating means for the liquid between the forward end of said cylinder and said variable chamber, said last-named means of communication including a restricted passage that is open for flow in either direction and a larger passage, and a one-way valve that closes said larger passage against flow of liquid to said variable chamber and permits flow of liquid therethrough from said variable chamber to the forward side of said piston.

8. A shock absorber comprising a cylinder with spaced walls, a piston within the inner wall of said cylinder, a piston rod connected to said piston and extending out through one end of said cylinder, the space within said cylinder being adapted to be filled entirely with liquid, a radially expansible cylindrical wall arranged between the walls of said cylinder and having its ends hermetically sealed about the ends of said cylinder, a by-pass tube located within said expansible cylinder and affording means of communication between only the spaces upon the forward and rear sides of said piston for the liquid that is displaced by said piston, and communicating means for the liquid between only the space at the forward side of said piston and that within said expansible wall for the liquid that is displaced by said piston rod.

9. A shock absorber comprising a cylinder, a piston within said cylinder, a piston rod connected to said piston and extending out through one end of said cylinder, the space within said cylinder being adapted to be filled entirely with liquid, communicating means between the forward and rear sides of said piston for the liquid that is displaced by said piston, a chamber that is separate from said cylinder and that is adapted to receive the liquid that is displaced by said piston rod, said chamber having an automatically pressure-responsive expansible wall, and communicating means for the liquid between the forward end of said cylinder and said separate chamber, said cylinder having a head provided with packing means spaced along said piston rod which extends therethrough, and said cylinder head being provided with communicating means from between said spaced packing means to said separate chamber so as to reduce the internal pressure upon the outer packing means and thereby relieve the danger of escape of liquid and to prevent ingress of outside air.

10. A shock absorber comprising a cylinder, a piston within said cylinder, a piston rod connected to said piston and extending out through one end of said cylinder, an outer wall surrounding said cylinder in spaced relation thereto, said outer wall having louvres in the rear part thereof opening rearwardly and louvres in the forward part thereof opening forwardly, and a hood carried by said piston rod, said hood extending over the head of said cylinder and surrounding said outer wall in spaced relation thereto so as to force air in through said rearward louvres and out through said forward louvres.

FRED A. MONTGOMERY.

REFERENCES CITED

The following references are of record in the file of this patent:

UNITED STATES PATENTS

| Number | Name | Date |
|---|---|---|
| 1,119,984 | Oxnard | Dec. 8, 1914 |
| 1,726 272 | Macdonald | Aug. 27, 1929 |
| 2,036,623 | Focht | Apr. 7, 1936 |
| 2,108,881 | Casper | Feb. 22, 1938 |
| 2,122,406 | Casper | July 5, 1938 |
| 2,240,644 | Focht | May 6, 1941 |
| 2,290,337 | Knauth | July 21, 1942 |
| 2,420,666 | Joy et al. | May 20, 1947 |